Nov. 28, 1961 G. E. ROWE 3,010,310
APPARATUS FOR TESTING GLASS CONTAINERS
Filed Dec. 4, 1957 7 Sheets-Sheet 1

INVENTOR
GEORGE E. ROWE
BY Bates & Willard
ATTORNEYS

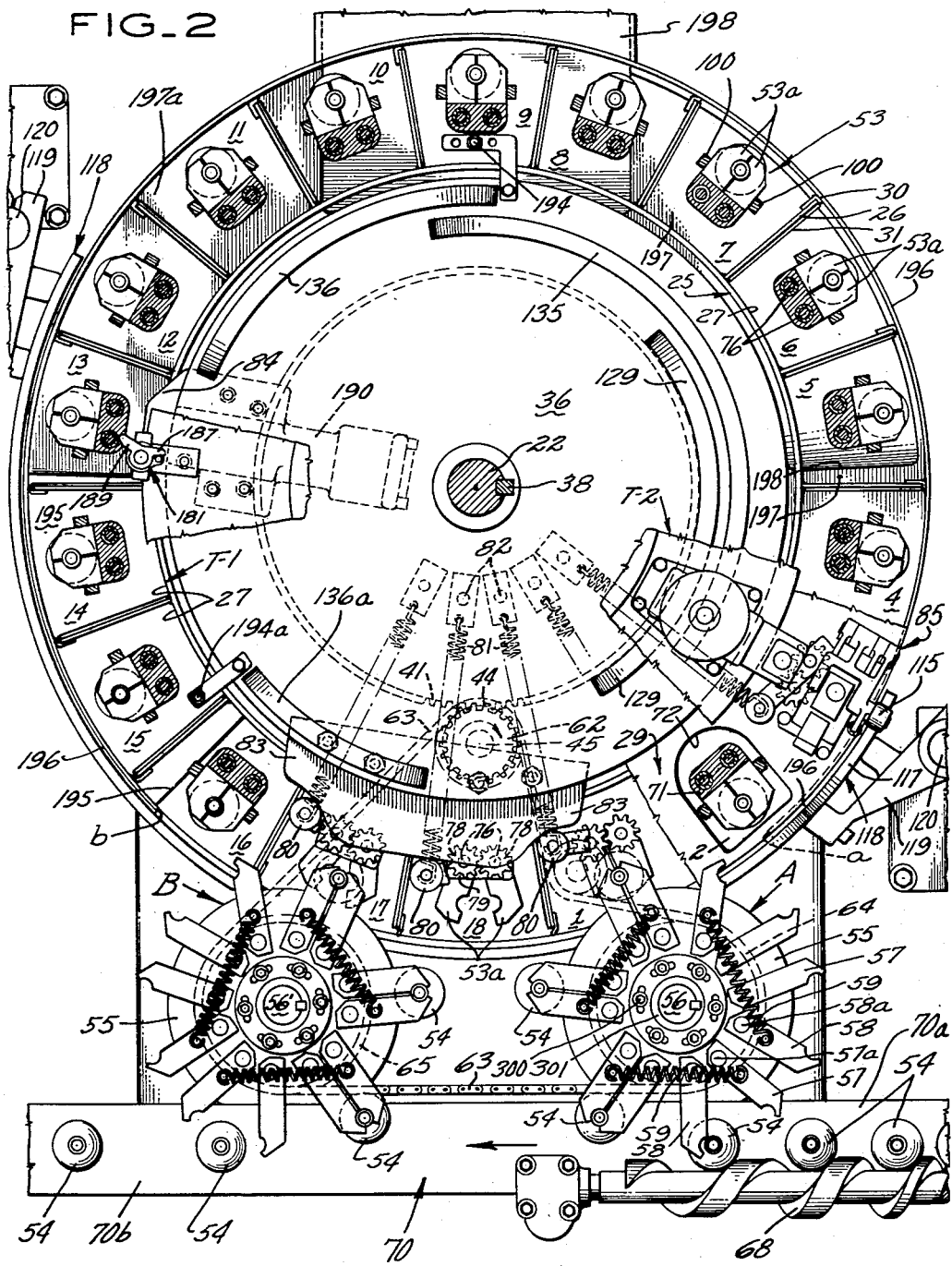

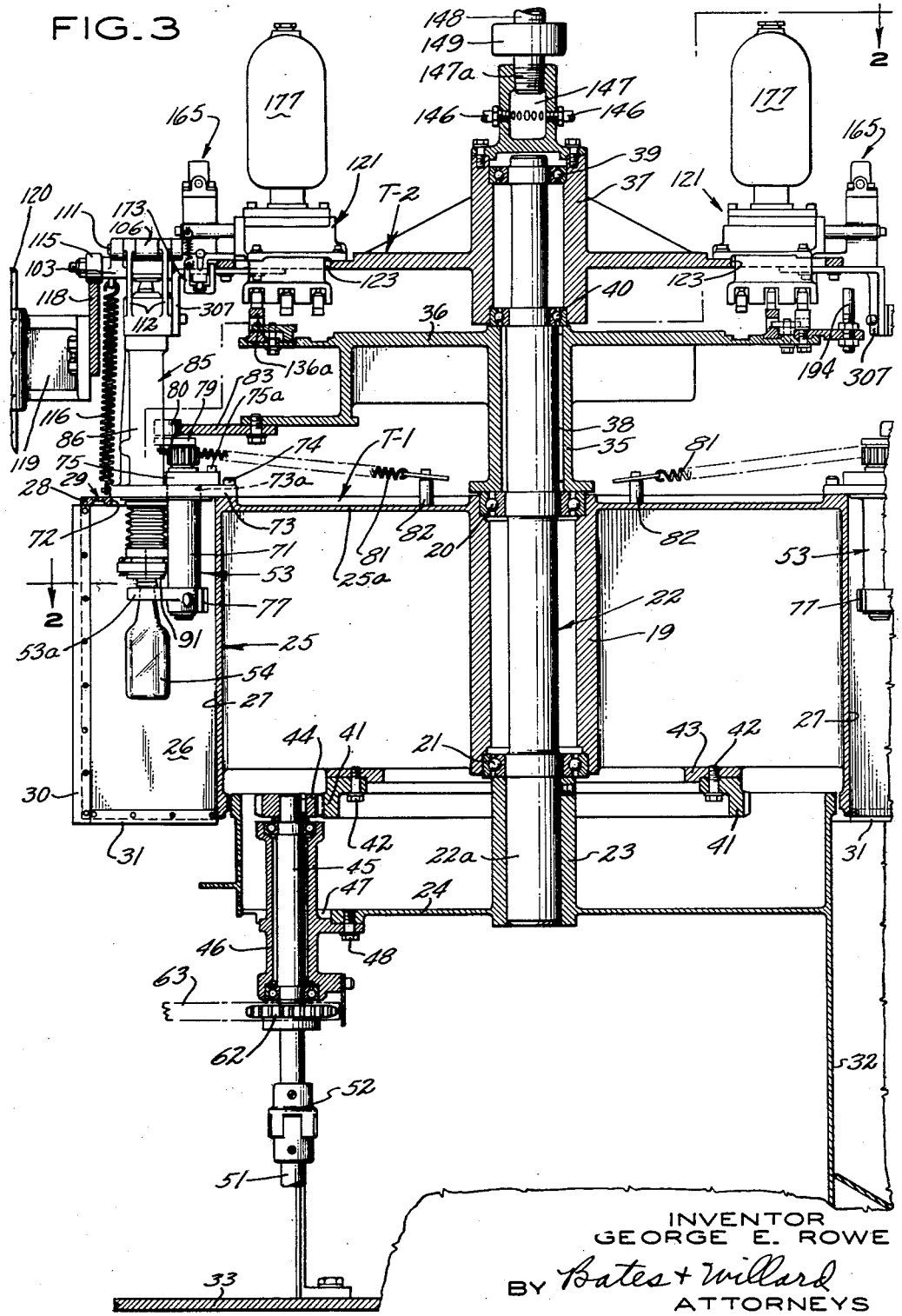

Nov. 28, 1961 — G. E. ROWE — 3,010,310
APPARATUS FOR TESTING GLASS CONTAINERS
Filed Dec. 4, 1957 — 7 Sheets-Sheet 4
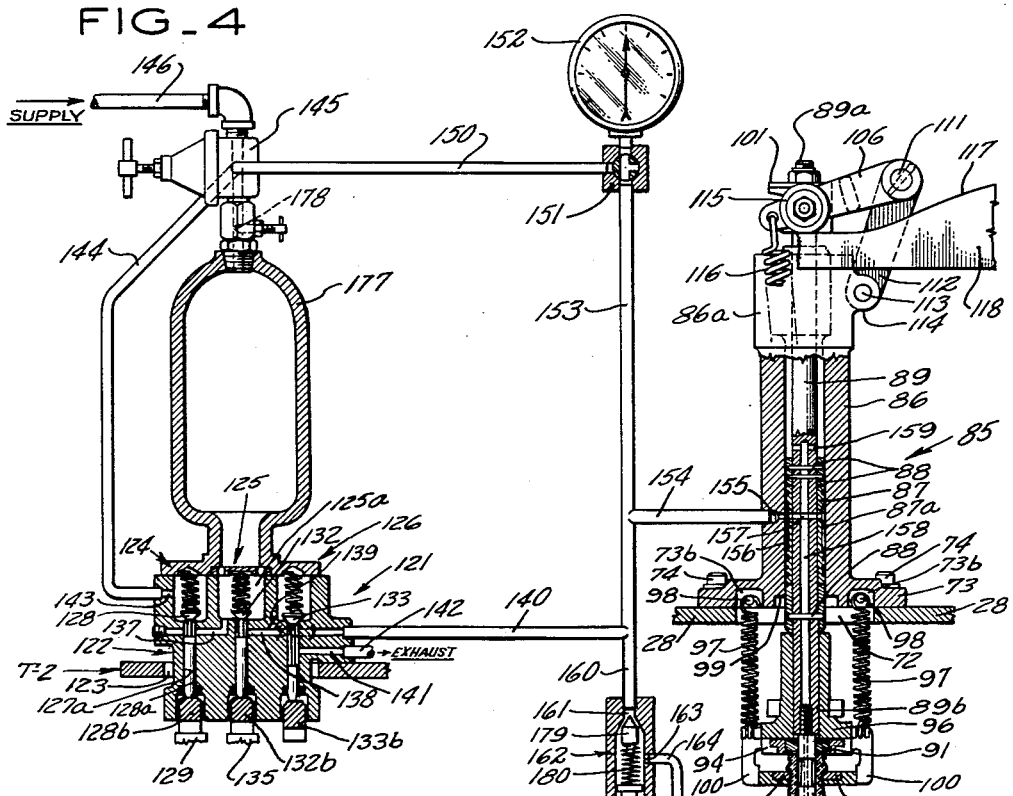
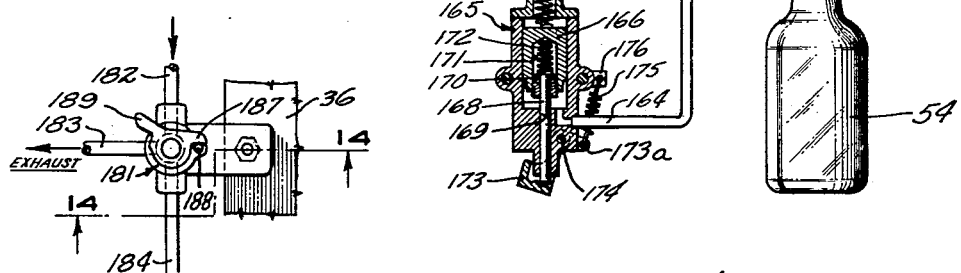
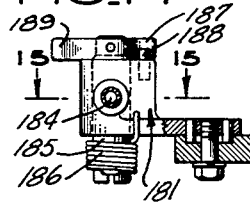
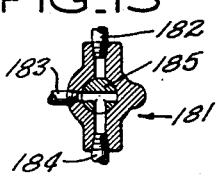
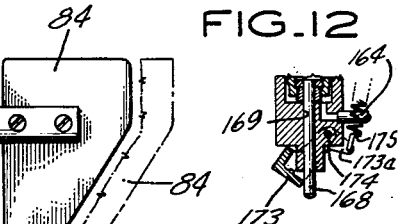
INVENTOR
GEORGE E. ROWE
BY Bates & Willard
ATTORNEYS

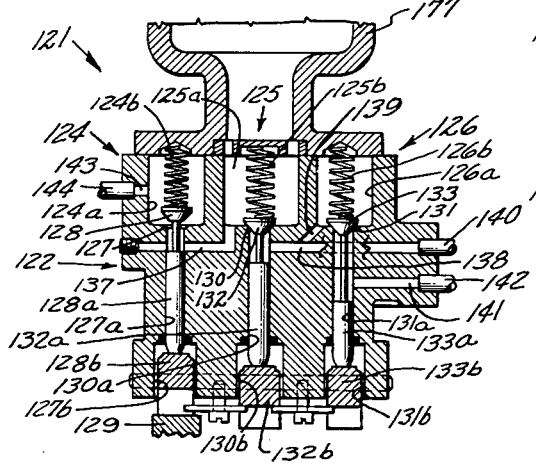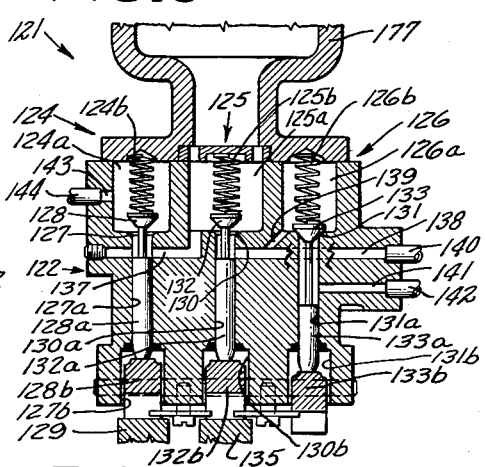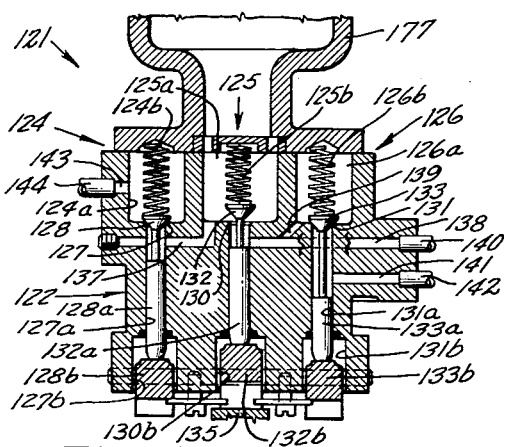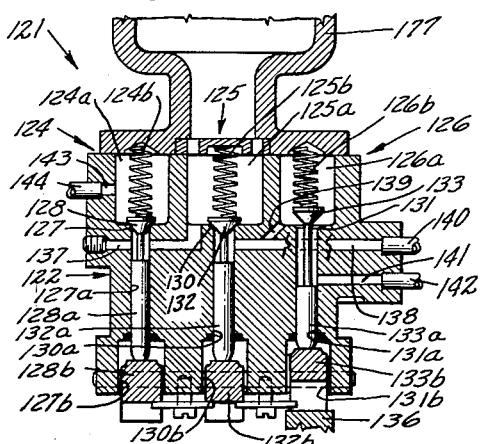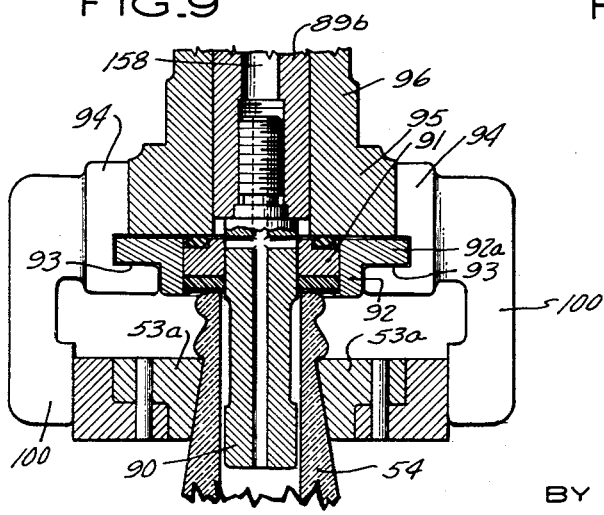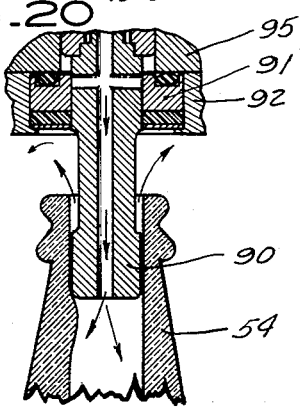

Nov. 28, 1961  G. E. ROWE  3,010,310
APPARATUS FOR TESTING GLASS CONTAINERS
Filed Dec. 4, 1957  7 Sheets-Sheet 6
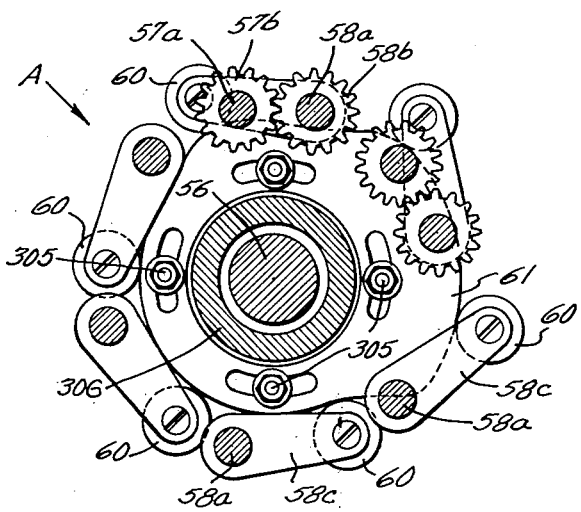
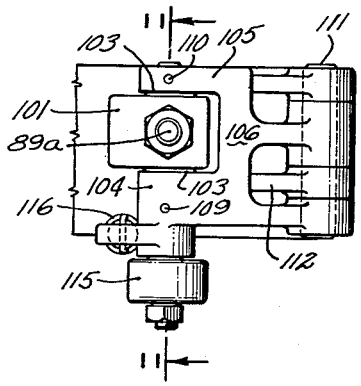
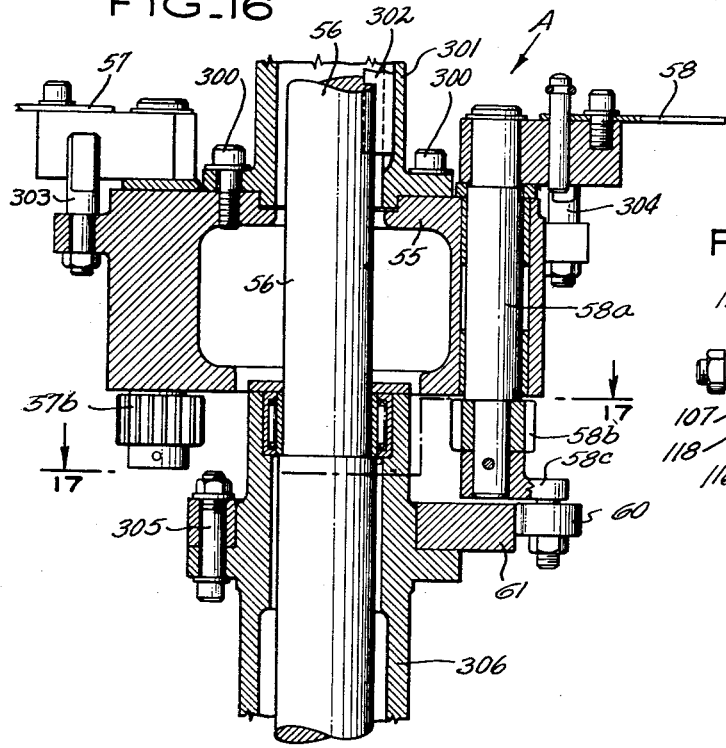
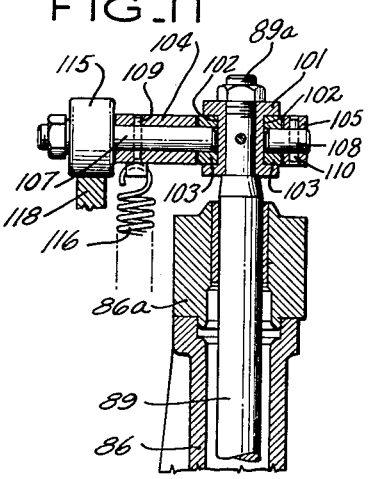
INVENTOR
GEORGE E. ROWE
BY Bates + Willard
ATTORNEYS Nov. 28, 1961     G. E. ROWE     3,010,310
APPARATUS FOR TESTING GLASS CONTAINERS
Filed Dec. 4, 1957     7 Sheets-Sheet 7
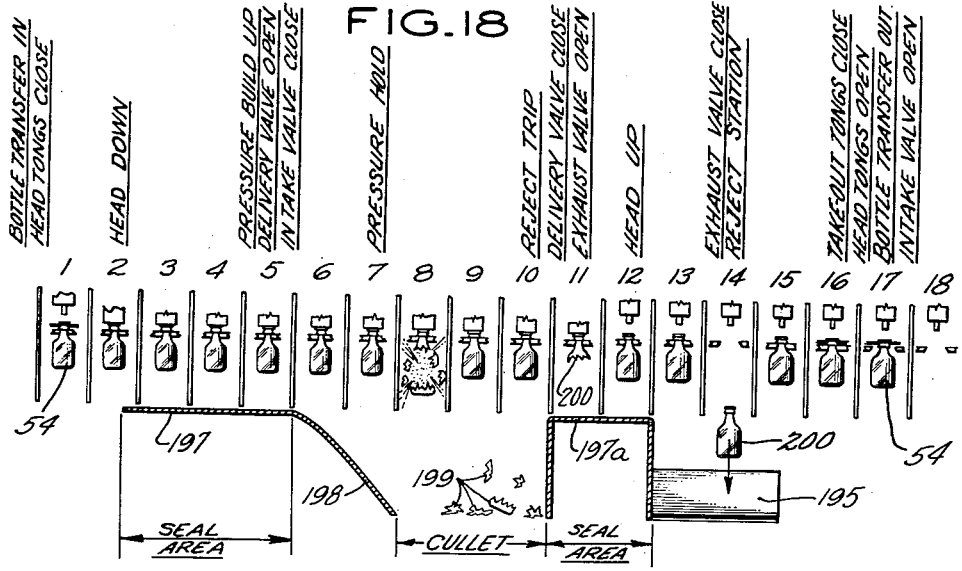
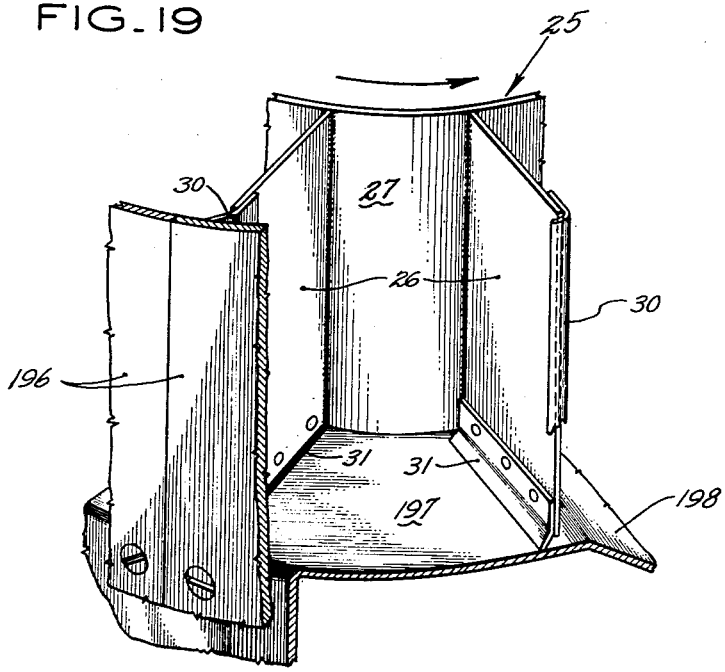
INVENTOR
GEORGE E. ROWE
BY Bates & Willard
ATTORNEYS

United States Patent Office 3,010,310
Patented Nov. 28, 1961

3,010,310
APPARATUS FOR TESTING GLASS
CONTAINERS
George E. Rowe, Wethersfield, Conn., assignor to Emhart
Manufacturing Company, Hartford, Conn., a corporation of Delaware
Filed Dec. 4, 1957, Ser. No. 700,621
12 Claims. (Cl. 73—45)

This invention relates to an apparatus for testing bottles, jars and other glass containers by internally applied pneumatic pressure to determine if such bottles satisfy minimum requirements for strength and also if such containers have choked necks, or have unfilled finishes which are not capable of retaining pressure.

A general object of the invention is to provide an efficient and reliable apparatus of the character described which will accept successive containers from a rapidly moving line of such containers, will test each container thus accepted, will return tested articles which meet applicable requirements to the moving line, and will eliminate from such line such tested articles as fail to satisfy applicable requirements.

A more specific object of the invention is to provide an automatic testing apparatus of the character described which will confine each container undergoing the required pressure test in a separate compartment and dispose of glass fragments and dust resulting from explosive breakage of the container if breakage should occur, without likelihood of injury to anyone adjacent the apparatus or damage to adjacent parts of the apparatus.

A further object of the invention is to provide a container testing apparatus of the character described which will employ air under pressure effectively and economically so as to minimize waste thereof and so that each container subjected to an internally applied pressure test will be subjected to substantially the same predetermined pressure despite tendency toward variation thereof in the air supply line as air under pressure escapes when a container undergoing test breaks or is unable to receive or hold without leakage the applied air.

A still more specific object of the invention is to provide an efficient arrangement of valves and pressure control means in the testing air supply and associate system and to associate therewith effective pneumatically controlled means to effect removal from the apparatus of the residual neck portions of the containers which have broken under the applied test or which have choked necks or unfilled finish portions, while retaining in the apparatus for return to a moving line such containers as have satisfied the applicable test requirements.

Other objects and advantages of the invention hereinafter will be pointed out or will become apparent from the following description of a practical embodiment thereof, as shown in the accompanying drawings, in which:

FIG. 1 is a front elevation, largely schematic, of the apparatus, numerous elements thereof being omitted and only fragmentary portions of others being shown, the view illustrating means for feeding successive bottles from a moving line to the apparatus and for returning tested bottles which have satisfied test requirements from the apparatus to an outgoing line;

FIG. 2 is a section through the apparatus substantially along the line 2—2 of FIG. 3, showing the circular arrangement of the series of test compartments of the apparatus with gripping means in each for accepting a bottle from an infeed transfer wheel at an infeed station, for suspending the bottle by its neck portion in the compartment during movement thereof around a vertical axis through nearly 360° should the bottle satisfy test requirements and for delivering the tested good bottle to a take-out transfer wheel by which it will be returned to an outgoing line;

FIG. 3 is a vertical section through the apparatus at the vertical axis of rotation of the series of test compartments, the view being schematic in that numerous parts are omitted and others are shown only partially;

FIG. 4 is a relatively enlarged vertical sectional view of the pneumatic pressure supply and exhaust means for each of the series of test units, showing a bottle suspended by the gripping means of one of such units with the nozzle of the pneumatic pressure means in position to apply air to the interior of the bottle and showing certain elements of the pneumatically controlled bottle reject mechanism which is associated with that unit;

FIG. 5 is a still further enlarged fragmentary vertical section of an assembly of valves of a pressure testing unit with the individual valves in the positions which they occupy under control of their respective cams at an early stage in a cycle of operations of the assembly;

FIGS. 6, 7 and 8 are views to FIG. 5 but showing the individual valves of the assembly in their positions at different subsequent stages in the cycle of such assembly;

FIG. 9 is a vertical section of the bottle gripping and sealing elements of a bottle suspending and pneumatic pressure testing unit, showing the relative positions occupied by elements of this portion of the testing unit when the bottle neck has been gripped and the nozzle of the pneumatic pressure applying means has been lowered completely to its operative position in the bottle neck;

FIG. 10 is a plan view of the upper portion of the pneumatic pressure testing unit, showing the means for movably supporting a vertically movable piston and connections for lowering the air nozzle to its operative position and for retracting it upwardly therefrom;

FIG. 11 is a section along the line 11—11 of FIG. 10;

FIG. 12 is a fragmentary sectional view of part of the pneumatic pressure responsive reject mechanism shown in FIG. 4;

FIG. 13 is a fragmentary assembly view of additional parts of the reject mechanism;

FIG. 14 is a view along the line 14—14 of FIG. 13 of a valve that is included in the reject mechanism;

FIG. 15 is a section of that valve along the line 15—15 of FIG. 14;

FIG. 16 is a relatively enlarged vertical section through one of the rotary bottle transfer wheel mechanisms;

FIG. 17 is a section along the line 17—17 of FIG. 16;

FIG. 18 is a chart showing a development of the circular series of individual bottle test compartments and their respective individual test units together with certain associate stationary structural parts of the apparatus, and indicating the sequence of operations in the handling and pressure testing of a bottle.

Figure 1:
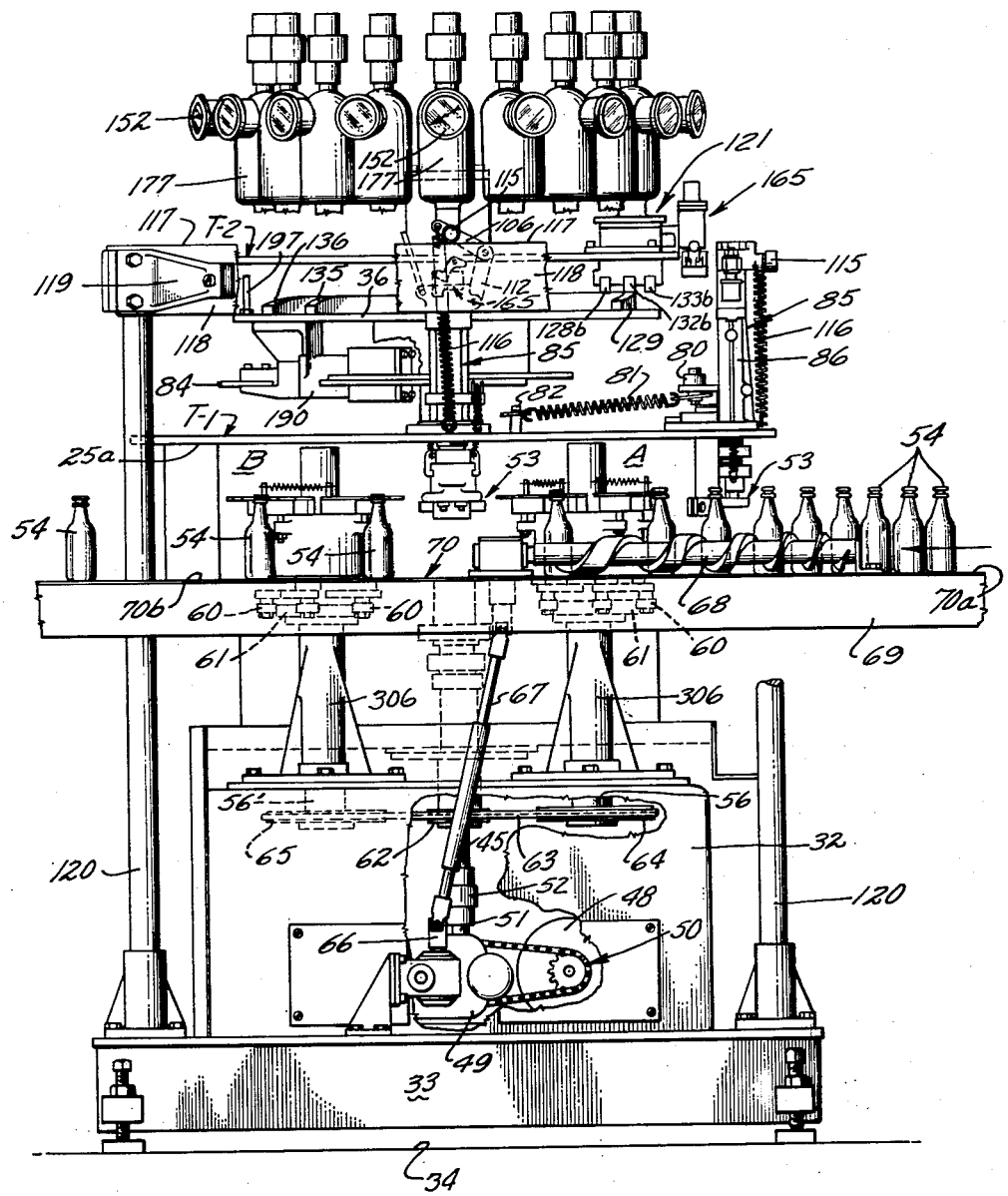

FIG. 19 is a fragmentary relatively enlarged detail of one of the test compartments to show the means for confining within the compartment the explosive force released by breakage of a bottle under the applied test pressure, together with flying dust and glass fragments produced by the explosion; and FIG. 20 is a fragmentary vertical sectional view showing the air nozzle and sealing ring of a test unit stopped above their operative positions with respect to a bottle neck by the choked internal formation of such neck.

The illustrative container testing machine of the drawings has a plurality—18, in the example shown—of test compartments which, as indicated by FIG. 2, extend in a circular series around the periphery of a lower rotary turret generally designated T-1. These compartments are numbered in FIG. 2 sequentially in a counterclockwise direction from 1 to 18, inclusive, with the No. 1 compartment located in position to be supplied with a container from a rotary container transfer mechanism generally indicated at A in that view.

As best seen in FIG. 3, the lower rotary turret T-1 is generally drum-shaped and includes a central hub 19 mounted anti-frictionally, as by the ball bearing assemblies indicated at 20 and 21, respectively, on a portion of a vertical axle 22 which has a lower end portion 22a firmly held by a vertical socket member 23 on a stationary supporting plate 24.

The turret T-1 has a cylindrical outer rim 25 provided with outwardly projecting angularly spaced vertical plates 26, each of which, as is clear from FIG. 2, is a side wall common to two adjacent test compartments. These side walls of the test compartments may lie in vertical planes radiating from the axis of rotation of the turret T-1. Angular spacing of adjacent plates 26 around the rim 25 of the turret T-1 provides each compartment with an inner wall 27 which is a portion of that rim. Each test compartment is covered at its top by a plate 28, FIG. 3, which may be an integral portion of an outwardly extending flange on the upper part of the turret T-1 as partially shown at 29 in FIG. 2.

Each of the test compartments as thus described will be open at its outer side and at its bottom except when these parts are covered by suitably located stationary surfaces of the apparatus as is the case for each compartment during part of its travel completely around the axis of rotation of the turret T-1 as hereinafter will be explained. To assure dust-proof sealing-off of each compartment during such part of its travel, the side walls 26 of these compartments may be provided with flexible sealing strips 30 and 31 attached thereto to project beyond the outer and bottom edges, respectively, of such compartment side walls for wiping contact with the adjacent stationary surfaces as later on will be explained.

The plate 24 on which the vertical axle 22 is supported, as hereinbefore stated, may be the top member of a box-like housing 32, FIGS. 1 and 3. This housing, best seen in FIG. 1, is carried by a machine base 33 which may be supported in any suitable or preferred manner on a factory floor 34 or the like.

The vertical axle 22 projects upwardly above the lower turret T-1 through the hub 35 of a stationary supporting plate 36 and thence into the vertical hub 37 of a rotatable generally plate-like upper turret T-2. Hub 35 of the stationary plate 36 may be fixed to the axle, as by a spline 38, FIG. 3. Suitable anti-friction bearing means, such as those indicated at 39 and 40, respectively, FIG. 3, may be provided to mount the hub of the upper turret T-2 for rotation about the upper end portion of the stationary axle. Upper turret T-2 is connected in a manner presently to be described with the lower turret T-1 so as to be rotated by the latter in unison therewith.

The lower turret T-1, in the example shown, is provided with a concentric ring gear 41 fastened, as by bolts 42, to its bottom wall 43. A pinion 44 fixed on the upper end of a vertical stub shaft 45 is in mesh with the ring gear 41. The stub shaft 45 is anti-frictionally journaled in a vertical sleeve 46 which depends from above through an opening 47 in the supporting plate 24 to which it may be attached, as by being bolted thereto at 48 in FIG. 3. A motor 48, FIG. 1, drives a speed reducer 49 through suitable transmission means indicated by the chain and sprocket arrangement at 50. A power output shaft 51 of the speed reducer is operatively coupled by suitable coupling means 52 to the lower end of shaft 45 so as to rotate the latter in the direction required to effect rotation of the lower turret T-1 counterclockwise as viewed in FIG. 2.

Each test compartment is provided with a mechanism generally indicated at 53, FIG. 3, for gripping a container, such as a bottle 54, by its neck portion so as to support that container in the compartment for the testing to be effected. The mechanism 53 includes a pair of openable and closable jaws 53a which, when open as shown for the jaws in compartment 18 in FIG. 2, are adapted to receive the neck portion of a bottle therebetween from the infeed transfer mechanism A as the turret rotates counterclockwise to bring the compartment 18 to the position of the No. 1 compartment and the infeed transfer mechanism A is rotating in a clockwise direction. The jaws 53a will then be closed by means presently to be described to grip the bottle neck therebetween.

The infeed transfer mechanism A comprises a wheel 55, FIGS. 2 and 16, fastened as at 300 to a sleeve 301 which is keyed at 302 to a vertical shaft 56 so that the wheel will rotate with the shaft and its fixed position thereon can be adjusted angularly within limits about the axis of the shaft. Each wheel 55 carries a plurality, six in the example shown, of pairs of cooperative pivoted jaw members which individually are indicated at 57 and 58, respectively, FIG. 2. These jaw members are adapted when closed to grip the neck portion of a bottle therebetween. Tenson coil springs 59 connect the respective jaw members 57 of alternate pairs with the respective jaw members 58 of the adjacent pairs and tend to maintain the pairs of jaws closed. The jaws 57 and 58 are fast on the upper ends of vertical rock shafts 57a and 58a, respectively, and the lower ends of these shafts carry spur gears 57b and 58b, which are enmeshed as shown in FIG. 17, so that rotary motion of either rock shaft about its axis will be transmitted to the other shaft to rotate the latter to the same extent but in the opposite direction. Fixed stop elements such as indicated at 303 and 304, respectively, in FIG. 16 limit swinging movements of the jaws 57 and 58 by their connected springs 59.

One of the rock shafts, as the shaft 58a, carries a rocker arm 58c, FIG. 17, provided with a cam follower 60 in contact with a stationary cam 61 which is suitably contoured to effect appropriate opening and to control the spring actuated closing of each pair of jaws 57–58 of the infeed transfer mechanism A to effect transfer of bottles from an infeed conveyor to the jaws of the gripper mechanisms 53 in the compartments of the lower turret T-1 as the latter rotates continuously about the axis of the vertical axle 22.

Cam 61 is fastened, as at 305, FIGS. 16 and 17, to a stationary vertical sleeve 306, FIG. 16, from which the rotary wheel carrying portion of shaft 56 projects, the fixed position of the cam thus being angularly adjustable within limits about the shaft 56.

A rotary take-out transfer mechanism B, FIGS. 1 and 2, for removing bottles from the gripper mechanisms 53 in the compartments when they have nearly completed a cycle of rotation about the axis of the machine turret is mounted on a vertical shaft 56', FIG. 2, for rotation with such shaft and, as illustrated, is essentially identical in construction and mode of operation as the infeed transfer mechanism A. The description hereinbefore given of the transfer mechanism A will suffice also for an understanding of the transfer mechanism B.

The rotary transfer mechanisms A and B are driven continuously but in opposite directions in suitable time relation to the rotation of the turret. As shown in FIG. 3, the shaft 45 is provided with a sprocket 62 and as shown in FIGS. 1 and 2, a chain 63 is trained about this sprocket and about sprockets 64 and 65 on the lower ends of the shafts 56 and 56' of the rotary transfer wheels A and B, respectively. These three rotary members, namely the lower turret T-1 and the rotary wheels of the transfer mechanisms A and B are thus all driven from the same power output shaft of the speed reducer 49, FIG. 1.

A second power output, indicated at 66, FIG. 1, is operatively connected by suitable transmission means 67 to a rotary horizontal worm 68 which is operatively mounted on the bed or supporting framework 69 of a horizontal conveyor 70 which, in the example shown, has an incoming portion 70a bringing bottles 54 to the infeed transfer mechanism A and a further portion 70b carrying tested good bottles 54 away from the take-out transfer mechanism B. The worm by its engagement with the bottles on the conveyor spaces them apart in a conventional manner so as to time the feeding of successive bottles to successive pairs of grippers on the rotary wheel of the infeed transfer mechanism A. Obviously separate conveyors could be employed to bring the bottles to the infeed transfer mechanism and to take them away from the take-out transfer mechanism.

Each turret compartment gripper mechanism 53, as illustrated in FIG. 3, comprises a vertical bearing block 71 extending through an opening 72 in the compartment cover plate 28 and through an opening 73a in a plate 73 that is fixed in place on that cover plate, as by bolts 74, FIGS. 3 and 4. A flange 75 on the upper end portion of block 71, FIG. 3, rests on the plate 73 and is fastened thereto as at 75a.

A pair of vertical rock shafts 76, FIG. 2, are journaled in the block 71. The gripper jaws 53a are fixed to the lower ends of these rock shafts, as by clamping means such as indicated at 77, FIG. 3, for one of these jaws. Enmeshed gears 78 are provided on the upper ends of the rock shafts 76 and one of these rock shafts is provided with a laterally projecting rocker arm 79 which, at its extremity, is provided with a cam follower roller 80. A tension coil spring 81 connects the extremity of this rocker arm 79 with a fixed anchoring post 82 on the top member 25a of the lower turret T–1. The spring 81 acts through the enmeshed gears 78 and the rock shafts 76 to tend to keep the jaws 53a of the gripper mechanism 53 closed. A fixed position cam plate 83, FIGS. 2 and 3, is provided for co-action with the cam follower roll 80 and rocker arm 79 to open the jaws 53a of each gripper mechanism 53 as shown for the jaw mechanisms in compartments 17 and 18 in FIG. 2, so as to release a bottle gripped thereby to the jaws of a gripper mechanism of the take-out transfer mechanism B and to remain open until a bottle has been transferred thereto from the infeed transfer mechanism A, at which time the cam 83 will permit the jaws 53a to close to take over support of the infed bottle.

Before arriving at the stationary cam 83, the gripper mechanism in a turret compartment may be opened by the coaction of its cam follower 80 with a reject cam 84, FIG. 13, provided that the reject cam has been projected from its retracted inactive full-line position to its active dot-and-dash-line position in FIG. 13. This operation and result will hereinafter be further explained.

In addition to a gripper mechanism 53, each compartment is provided with a fluid pressure applying mechanism generally indicated at 85 in FIGS. 3 and 4 for applying air under a predetermined pressure to the interior of the bottle that is suspended in that compartment by such gripper mechanism.

Each fluid pressure applying mechanism comprises a vertical cylinder 86, the lower end portion of which may be flanged outwardly to provide the aforesaid plate 73 mounted on the compartment cover plate 28, whereby the bore of the cylinder will be located over the opening 72 in such cover plate. A piston 87 in the cylinder 86 is in the form of a sleeve fixed, as by pins 88, to a vertical rod 89 which has an upper end portion 89a projecting upwardly through and above the upper head 86a of the cylinder, as best seen in FIG. 11, and a tubular lower portion 89b extending downwardly from the cylinder through the opening 72 in the compartment top plate, as best seen in FIG. 4. The tubular lower end portion 89b of the piston rod carries a detachably connected nozzle 90 which is adapted to enter the normally formed neck of a bottle when the piston is in its lower position, as shown in FIG. 4.

A pressure sealing ring 91, the construction of which may be as shown in FIG. 9, will be held firmly against the upper end surface of the neck wall of the suspended bottle 54 in the compartment when the piston 87 is at the lower end of its stroke and the nozzle 90 is within the bottle neck as shown in FIG. 4. This pressure sealing ring is mounted in a carrying ring 92 which has a flanged upper end 92a, diametrically opposite portions of which are supported at 93–93 by transversely grooved opposite portions of downwardly extending integral lugs 94 on the flanged lower end 95 of a sleeve 96 on the tubular lower end portion 89b of piston rod 89. Tension springs 97 are attached at their lower ends to the lugs 94 and at their upper ends to pins 98 located in bottom recesses 73b in the flanged lower head plate 73 of cylinder 86. These springs tend to retract the sleeve 96 and the sealing ring assembly 91–93 upwardly with the piston 87 on an upward stroke thereof in the cylinder 86. When the upper end of the sleeve 96 strikes the top of a counter-bore 99 in the bottom end of cylinder 86, further upward movement of the sleeve will be stopped even though the piston may continue upwardly. This will strip the nozzle 90 from a bottle neck should for any reason such a bottle neck be stuck to the nozzle so as to be lifted by the latter.

The lugs 94 on the flanged lower end of sleeve 96 have downwardly extending integral arms 100 suitably spaced apart to fit snugly against the outer sides of closed gripper jaws 53a when the test air applying nozzle has been lowered to its operative position in the neck portion of the bottle 54 as shown in FIGS. 4 and 9, thereby positively holding these gripper jaws closed for the pressure testing of the bottle.

The upper end portion 89a of the piston rod has a block 101 fixed thereto as best seen in FIGS. 10 and 11. This block is provided with horizontal ways 102, 102, in opposite sides thereof to accommodate traveler blocks 103, 103, which are slidable therein. Forks, indicated at 104 and 105, respectively, FIGS. 10 and 11, of a forked arm 106, FIGS. 3, 4 and 10, are connected pivotally with the traveler blocks 103, 103, respectively by pins 107 and 108, respectively. These are fixed by pins 109 and 110, FIG. 11, to the forks of arm 106. Arm 106 is connected by a free horizontal pivot 111, FIGS. 3, 4 and 10, to a supporting arm 112 which is pivotally mounted at its lower end at 113 to a laterally embossed portion 114 of cylinder 86.

The fork 104 of arm 106 carries a cam roller 115 which may be mounted on a projecting outer end portion of the pivot pin 107. A tension coil spring 116 connects this fork of arm 106 with the flange 73 on the underlying turret compartment as best seen in FIG. 3. This spring thus tends to move the piston 87 downwardly in the cylinder 86 from its raised position to its lowered position shown in FIG. 4 and to maintain it at the latter position. However, during part of the travel of a compartment around the vertical axis of the turret, the roller 115 will ride up an inclined top surface 117 of a stationary cam rail 118 so as to effect raising of the piston end of the parts carried by the latter. The cam rail 118 is carried by brackets 119 on uprights 120 uprising from the base 33 as shown in FIG. 1.

The fluid pressure supply and exhaust system of each unit 85 comprises a valve assembly generally indicated at 121, FIGS. 1 and 3 to 8, inclusive. This valve assembly comprises a block 122 mounted in an opening 123 in the upper turret plate T–2, as best seen in FIG. 3, so that three valves, respectively indicated at 124, 125 and 126, FIGS. 4 to 8, inclusive, are in line with one another in a direction extending radially of the turret, the valve 124 being nearest to and the valve 126 farthest from the axis of rotation of the turret.

The valves 124, 125 and 126 have individual chambers respectively indicated at 124a, 125a and 126a. A port 127 in the bottom of valve chamber 124a is continued as a vertical bore 127a through the block 122, this bore opening at its lower end through the top of a through channel 127b in the bottom of the block 122. A tappet valve 128 is adapted to seat in the port 127 and is urged continuously to its seated position by a light coil spring 124*b*. The valve 128 has a stem 128*a* which depends through the port 127 and the vertical bore 127*a* close to a vertically raisable pivoted valve lifter 128*b* in the underneath channel 127*b*. At a predetermined point in the travel of the valve block 122 along its path extending around the axis of the machine turret, valve lifter 128*b* will ride on an arcuately curved cam rail 129 on the stationary supporting plate 36, FIG. 2, and be raised to lift valve stem 128*a* and thus open the valve 128.

The valves 125 and 126 likewise have ports indicated at 130 and 131, respectively, in the bottom of their chambers, these ports being continued as vertical bores 130*a* and 131*a*, respectively, downwardly through the valve block 122 to channels 130*b* and 131*b*, respectively, in the bottom of the valve block. Tappet valves 132 and 133, respectively, are provided in the valve chambers 125*a* and 126*a* to control the ports 130 and 131, respectively. These valves are urged to seated positions in their ports by light coil springs 125*b* and 126*b*, respectively. Valve 132 has a stem 132*a* depending into channel 130*b* and is opened by lifting of a pivoted valve lifter 132*b* by the upper surface of a cam rail 135 on supporting plate 36, FIG. 2, during part of the travel of the valve block around the axis of rotation of the turret. Valve 133 has a stem 133*a* depending through the bore 131*a* into the channel 131*b* and is openable by a pivoted valve lifter 133*b* which is raised by contact with the upper surface of a cam rail 136, which also is mounted on the supporting plate 36, FIG. 2. Valve 133 may also be opened near the end of such travel of the valve block by an additional cam rail 136*a*, FIG. 2, which also is mounted on stationary plate 36. The positions of these cam rails on the plate 36 may be adjusted angularly within limits around the axis of rotation of the turret and their respective lengths and relative positions are predetermined to assure opening and closing movements of the valves of each assembly at the proper times and places in the operation of the machine.

A passage 137 in the block 122 connects the port 127 with the chamber 125*a* of valve 125. A passage 138 from the port 130 communicates through a short passage 139 with the chamber 126*a* of valve 126 and leads around port 131 to an outtake pipe 140. Port 131 communicates through a portion of the bore 131*a* with an exhaust passage 141 leading to an exhaust pipe 142. Valve chamber 124*a* is provided with an inlet 143 with which a fluid pressure intake pipe 144 is connected. Pipe 144 receives fluid pressure from a pressure regulating valve 145 with which a main pressure air supply pipe 146 is connected. Pipe 146 leads from a common fluid pressure distribution chamber 147 in a housing on the hub 37 of upper turret member T–2. See FIG. 3. A stationary fluid pressure supply pipe 148 has a fluid-tight swivel connection 149 with the wall of an inlet 147*a* in the top of the distribution chamber 147.

Pressure regulating valve 145 has a second branch 150 leading to a two-way valve 151, FIG. 4, which may be turned to connect a pressure gage 152 with branch 150 and pressure regulator 145 or with a pipe 153 into which the pipe 140 empties, as shown in FIG. 4. Pipe 153 has a branch 154 leading to a port 155 in the wall of cylinder 86.

Piston 87 has an externally reduced intermediate portion 87*a* so as to provide an annular space 156 between that portion of the piston and the inner wall of cylinder 86 and pressure fluid will pass from the port 155 into this space when the piston has been moved downward in the cylinder for part of its downward stroke and for the remainder of such stroke. Radial ports 157 connect the annular space 156 with the bore 158 of the tubular portion of the piston rod 89 as shown in FIG. 4. Some of the air from the bore 158 may pass through radial ports 159 into the interior of the cylinder above the piston so as to tend to maintain the piston at its lower limit of travel. The sealing ring 91 thus will be firmly pressed by fluid pressure action against the mouth of the suspended bottle in the underneath test compartment as well as by the action of the spring 116.

The pipe 153 has a branch 160 leading to the inlet port 161 of a one-way valve 162. This valve 162 has an outlet 163 connected by a tube 164 with the interior of a vertically disposed cylinder 165 beneath a piston 166 which is slidable therein. Piston 166 is urged downward in cylinder 165 by a light coil spring 167 but will be kept in a raised position as shown in FIG. 4 by fluid pressure from supply line 140, 160, valve 162, and tube 164. Piston 166 carries a depending rod 168 which extends downwardly therefrom through a vertical bore 169 in the bottom head of cylinder 165 to a level slightly below the latter when piston 166 is in its raised position in the cylinder and, when permitted, to a substantial distance therebelow when the piston is in its lowermost position in the cylinder. Rod 168 has a head 170 which is slidable vertically in a chamber 171 in the piston. A coil spring 172 tends to keep the head 170 at the bottom of piston chamber 171 and the rod 168 thus fully projected downwardly with respect to the piston. The rod 168 may be prevented from moving downward with the piston 166 on release of pressure beneath the latter by a pivoted rigid rod hold-up element 173 which is pivotally mounted at 174, FIG. 4, on the lower head portion of cylinder 165 and has a projecting arm 173*a* connected by a coil spring 175 to a fixed anchoring element 176 on the cylinder 165 so as to tend to maintain the pivoted rod hold-up element partially beneath and in contact with the rod 168 as shown in FIG. 4. This pivoted rod hold-up or latching element will, however, be swung about its pivotal connection with the cylinder to an out-of-the-way position as shown in FIG. 12 by means hereinafter described to permit complete downward projection of the rod so that it may function as intended in the operation of the machine and as later explained herein.

The movable valve element of the one-way valve 162 is a plug, indicated at 179, urged by a light coil spring 180, the pressure of which may be adjusted within limits, to position to close intake valve port 161.

The valve assembly includes a pressure stabilizing reservoir 177 which is in open communication at its bottom with the chamber 125*a* of the middle valve of such assembly. A valved bleed passage 178 leads from the pressure regulating valve 145 to the interior of reservoir 177 at the top of the latter, the function of this bleed passage being to restore pressure in the reservoir and in the valve chamber 125*a* to the desired level to compensate for slight leakage which may occur at times in the normal operation of the test unit.

A cycle of operations of the fluid pressure system as just described of a test unit will now be described. Compressed air that has been supplied thereto at a higher pressure may be regulated by the pressure regulating valve 145 so that air entering the valve 124 is at the pressure desired for testing a bottle for the time available during the operation of the machine. Thus, the testing pressure may be 200 lbs. per sq. inch with a period of sustained pressure application of 2 seconds. Under some conditions the machine may operate at higher speeds with a correspondingly shortened period of sustained pressure application. A lower testing pressure may be employed under certain conditions or if a longer period for sustained application thereof is available.

It will be understood that the individual valve assemblies 121 for the respective test compartments 1 to 18, inclusive, travel with such compartments around the axis of rotation of the machine turret, the components of which (T–1 and T–2) are connected to rotate in unison, as by brackets 307, FIG. 3, fastened firmly to the upper turret T–2 and to cylinders 86 on the lower turret T–1.

Starting in a counterclockwise direction from the position that would be occupied by the valve assembly of the test unit for compartment 1 in FIG. 2, the first actuation of a valve of that assembly would be raising of the valve member 128 of valve 124, FIG. 5, by cam rail 129. This will supply fluid pressure, as, for example, air compressed to the test pressure desired, to the chamber 125a of valve 125. Valve 124 thus serves as the intake valve of the assembly. As is evident from FIG. 2, the cam roll 115 of the test fluid pressure applying mechanism 85 of the unit descends from the cam 118 at about that time, thereby permitting descent of the nozzle plug gage into the neck of the bottle that is suspended by the gripper mechanism of that test unit, positioning of the pressure sealing ring in contact with the upper end of the bottle neck, and locking of gripper jaws in gripping relation to the bottle neck, all as shown in FIG. 4. Now, when the valve member 132 of fluid pressure delivery valve 125 is raised as shown in FIG. 6 by its cam rail 135, FIG. 4, test air will be delivered to the test mechanism 85 and downwardly in the bore 158 of tubular piston rod portion 89b and nozzle 90 into the bottle to be tested and also will be admitted to the cylinder 86 above the piston 87 to aid in holding the sealing ring firmly pressed against the end surface of the bottle neck.

To minimize loss of test pressure air in the event that the bottle has a leaky finish end surface or a choked neck or should burst under test, the cam rail 129 is arranged in relation to the cam rail 135 that the intake or supply valve 124 will close when the valve 125 has been open long enough for full test pressure to have been established in a good bottle under test. The positions of the valves of the assembly will then be as shown in FIG. 7.

When the valve 125 also is permitted by its cam rail 135 to close, the valve member 133 of the valve 126, which is the exhaust valve of the assembly, will be raised by its cam rail 136, as shown in FIG. 8, for relief of pressure from the tested bottle.

Test pressure air will have been supplied during the testing of a good bottle through valve 162 to the cylinder 165 to maintain the piston 166 therein in its raised position as shown in FIG. 4. If, during the normal test period, the pressure thus exerted on the piston 166 should be relieved, as by leakage of test pressure because of a leaky bottle neck finish, a choked bottle neck, or bursting of the bottle under test, the piston 166 will descend in the cylinder 165 but the depending rod 168 will be retained in its elevated position by the pivoted latch 173 until the latter has been opened. A latch opening upright pin 194 is provided on the support 36, FIG. 2, in position to be contacted by the closed latch 173 and to bias the latter to open position just before completion of the normal test period. If pressure is being maintained in the test system, as when a good bottle is undergoing test, the rod 168 will be kept up by the elevated position of its carrying piston 166 while the latch 173 is thus briefly open. Otherwise, the rod 168 will descend and will remain down for actuation of a reject valve as hereinafter will be explained.

The reject mechanism includes a two-way valve 181, FIGS. 2, 13, 14, and 15, having an inlet pipe 182 for supplying air under pressure to the valve and two outlets, one connected to an exhaust pipe 183 and the other, which is opposite the inlet pipe 182, being connected to a delivery pipe 184. The movable valve element of valve 181 is a rotary plug as indicated at 185 and is continuously rotatively urged by a torsion spring 186 to position to establish communication therethrough between the exhaust pipe 183 and the delivery pipe 184. A short arm 187 on valve element 185 bears against a fixed position stop pin 188 at this time. If, however, the trip rod 168 of valve 165 is in its downwardly projected position when the rotation of the turret brings it to the valve 181, this rod will strike the operating arm 189 of the rotary valve element 185 and will rotate it counterclockwise as viewed in FIG. 13 so as to connect the inlet 182 with the delivery pipe 184. Delivery pipe 184 leads to one of a cylinder 190 in which is mounted a piston 191 having a rod 192 carrying the aforesaid movable cam 84 for opening the jaws of a gripper mechanism 53. Spring 193 urges the piston 191 toward the limit of its travel toward the pressure receiving end of cylinder 190. Air under pressure from the pipe 184 will overcome the action of this spring and cause the cam 84 to be projected to its broken line position as shown in FIG. 13.

After actuation of the valve arm 189 of valve 185 by the downwardly projected trip rod 168, the spring 186 will return the valve to its normal position as shown in FIG. 13, at which time air will be exhausted from the cylinder 190 through the valve and exhaust pipe 183. This will be attended by retraction of the movable cam 84. During the projection of such cam, however, the roll 80 of the gripper mechanism 53 will have contacted that cam and caused opening of the jaws 53a so that the previously gripped defective bottle or neck portion of a broken bottle may fall from the compartment into a reject chute or other receptacle 195, FIG. 2. In the case of a good tested bottle, the jaws will not be opened until their cam follower roll 80 has contacted the cam 83, FIG. 2, to effect release of the good bottle to a pair of jaws on the take-out transfer mechanism B. In either event, it will be understood that the cam follower roll 115 of the test pressure applying mechanism will have been moved by the rotation of the turret onto its cam 118, FIG. 2, prior to actuation of the reject valve 181 by the rod 168 should the latter be downwardly projected and that the air nozzle will have been raised and the jaws 53a released from their clamping arms 100, FIG. 4, prior to any need for opening of such jaws to release a defective or broken bottle.

The adjustment of the adjustable spring loading of the movable valve element 179 of valve 162 may be such as to keep this valve closed against the inflow of air from the connected line 160 until full test pressure or substantially full test pressure has been attained. In this adjustment, the valve 162 will be closed when the pressure in line 160 falls appreciably below test pressure, as when the controlling exhaust valve 126 is opened at the end of a test period or pressure is relieved by breaking of a bottle to which the test pressure air has been applied. This will tend to trap test pressure air in the cylinder 165. While any suitable known positively acting means may be employed to release pressure from beneath the piston 166 in cylinder 165 sufficiently to permit a timely spring-actuated downstroke of such piston and a similarly actuated downward projection of the reject valve trip rod 168 when permitted as hereinbefore explained, it has been found in practice that there is enough leakage of trapped air from the cylinder 165 and connections to permit such timely movements of piston 166 and rod 168.

If the rod 168 is already in its downwardly projected position at the start of a test period, it will remain there and actuate the reject valve at the proper time if the bottle to be tested will not hold pressure supplied thereto by the test nozzle as by reason of a choked neck as shown in FIG. 20 or an unfilled neck finish or other defect that will cause leakage of the test pressure air. On the other hand, if the rod 168 is in its downwardly projected position at the beginning of a test period and no bottle to be tested has been supplied to the compartment involved, as in the case of a gap in the line of bottles transferred to the turret compartments by the infeed transfer mechanism A, FIG. 2, test pressure will be built up to open the valve 162 and the piston 166 in valve 165 will be raised to maintain the rod 168 elevated during the normal test period so as to avoid unnecessary actuation of the reject mechanism and opening of the compartment grippers at the reject station. No test pressure is being supplied to the nozzle of this mechanism at this time, however, as the piston rod 89 will descend under actuation of its spring 116, FIG. 4, until the block 101 on the upper end of the piston rod strikes the upper head member 86a of the cylinder 86 and the piston 87 then will be in position to block off inflow of test pressure from the connected line 154 to the interior of the cylinder 86.

To assure positioning of the rod 168 in its downwardly projected position at the beginning of the test period, the pivoted latch 173 for holding up the rod may be moved to its out-of-the-way position as shown in FIG. 12 by the second trip pin 194a just before completion of the cycle of movements of the test unit around the axis of rotation of the machine turret. At about the same time in such cycle or shortly thereafter, the exhaust valve 126 of the valve assembly of such unit will be opened a second time by the second exhaust valve cam rail 136a which is suitably located for that purpose, as also is clear from FIG. 2. This will release any residual superatmospheric pressure in the connected air lines before the test mechanism starts on a new cycle.

Each of the series of compartments, 1 to 18, inclusive, on the periphery of the lower turret member T–1 is open at its outer side while it is moved counterclockwise, as viewed in FIG. 2, past the take-out transfer mechanism B and past the infeed transfer mechanism A. Howevr, during the remainder of its travel around the axis of rotation of the turret, each compartment may be closed or covered at its outer side by an arcuate guard wall 196 which, as shown in FIG. 2, has one end, indicated at a, located just beyond the infeed transfer mechanism A, and its opposite end, indicated at b, terminating short of the transfer take-out mechanism B. This guard wall 196 is partially shown in FIG. 19 and is of sufficient vertical extent and is so located with respect to the outer edges of the side walls 26 of the compartments that the sealing flaps 39 projecting therefrom wipe against the inner surface of the wall 196. Glass dust or bottle fragments will thus be prevented from flying outward should a bottle break under the applied test pressure.

Also, further to preclude injury to adjacent parts of the machine or to any person near the machine by reason of flying glass fragments or dust, a bottom plate which is partially shown in FIGS. 18 and 19 and indicated therein generally at 197 is provided to cover the bottom of each of the compartments during that part of its travel around the axis of rotation of the turret in which breakage under test pressure may occur. This bottom plate 197 is of sufficient radial extent to extend beyond the outer edge of the compartment side walls and to be wiped by the bottom flaps 31 on the bottom edges of such side walls while a bottle in the compartment is being pressure tested and until any bottle that breaks under the test pressure or fragments thereof have been safely disposed of. Thus, the suspended bottle in a compartment will be fully enclosed by the time such compartment reaches the position of compartment 3 in the chart of FIG. 18. A cullet chute 198 is located at an appropriate place along the path of travel of the compartment, and any dust or glass fragments, such as those indicated collectively at 199 in FIG. 18, will be dropped or blown into this cullet chute during the travel of the compartment through the positions of the compartments 8, 9 and 10 in FIG. 18. Thereafter, the compartment will be closed at its bottom by a normal level portions 197a of the bottom plate 197 until it arrives at the chute or receptacle 195, FIGS. 2 and 18, into which any rejected whole bottle or any fragment, such as indicated at 200 in FIG. 18, of a bottle that has burst under the test pressure and is retained by the grippers, will be dropped by opening of the grippers in the mamnner and by the means hereinbefore described.

A sequence of operations of the cooperative transfer mechanisms A and B and of the pressure applying mechanisms and bottle gripping tongs of the test units of the machine is indicated by appropriate legends in the chart of FIG. 18 and will be clear when this chart is read in conjunction with FIG. 2. Thus, in these views, the compartment 1 is in a position to receive a bottle from the infeed transfer mechanism A. At this time, the grippers in such compartment, referred to on the chart as "head tongs," will be closed to take over support of the bottle that has been supplied to that compartment. The piston and connected parts of the test pressure applying mechanism, referred to in the chart as the "head," will be lowered to position the air discharge nozzle thereof in the neck portion of the supported bottle and to seal off the space within the bottle from the ambient atmosphere.

Test pressure will be built up in such bottle by opening of the delivery valve 125 and the immediately following closing of the intake valve 124 of the valve assembly 121 involved so that the bottle will be subjected to internally applied test pressure while the compartment in which it is contained in moving through the positions occupied by compartments 5, 6, 7, 8, 9, and is approaching the position of compartment 10 in FIG. 18. At this point, the pivoted latch for holding up the reject valve trip rod will be actuated and the exhaust valve of the assembly 121 will be opened.

If the bottle has burst under the test pressure applied, as at the position along its path of travel indicated by the compartment 8 in FIG. 18, the reject mechanism will be actuated to release the retained fragmentary neck portion at the reject station. Prior to such release, the pressure head mechanism will have been raised and the exhaust valve 126 will have been closed.

A good bottle will, of course, be retained in the compartment until the tongs of the take-out transfer mechanism have closed about it, as in the position indicated for compartment 16, at which time the tongs in the compartment will open to release the bottle to the take-out transfer mechanism. This will occur at the position indicated by the compartment 17 in FIGS. 18 and 2. The tongs within the compartment will remain open while the compartment is in the position shown for the compartment 18 and while passing to the position of compartment 1 to initiate a new cycle.

The illustrative embodiment of the invention shown in the accompanying drawings and herein particularly described may be varied and modified in ways which will now be obvious to those skilled in the art and I therefore do not wish to be limited to the details of such embodiment.

I claim:

1. Bottle testing apparatus comprising a turret rotatable about a vertical axis and having a series of test compartments extending around its periphery, each compartment being open at its outer side to permit a bottle to be moved bodily thereinto while in an upright position at a bottle infeed point along the path of movement of the compartments around the axis of rotation of said turret and similarly removed therefrom at a bottle take-out point located farther along said path, releasable bottle suspension means in each of said compartments and movable therewith around the axis of rotation of said turret, means to introduce fluid under a predetermined test pressure into each bottle held by the suspension means in each compartment and to seal the mouth of the bottle against escape of pressure for a predetermined test period during travel of such compartment along part of said path extending between said bottle infeed and bottle take-out points, and a guard wall extending part way around said turret between said bottle-infeed and bottle take-out points in position to cover the outer side of each compartment during the application of test pressure to the interior of a suspended bottle in such compartment.

2. Bottle testing apparatus as defined by claim 1 wherein said test compartments are open at their bottom and a stationary bottom plate is provided in association with said turret and in position to cover the bottoms of said compartments during application of test pressure to the bottles suspended therein.

3. Bottle testing apparatus as defined by claim 2 wherein said bottom plate is in part formed to provide an outlet for diverting to a cullet receptacle glass dust and fragments resulting from breakage under test pressure of a bottle in any of said compartments.

4. Bottle testing apparatus as defined by claim 1 wherein said compartments are provided with projecting flexible vertical side and horizontal bottom strips arranged to have wiping contact with said guard wall and bottom plate, respectively, during rotation of said turret.

5. In bottle testing apparatus, releasable bottle gripping means for holding a glass bottle in a vertical position with its mouth uppermost, a nozzle insertable in a properly formed mouth end portion of a bottle held by the gripping means, a sealing ring adapted for sealing contact with the mouth of the thus held bottle, a vertical cylinder disposed above the gripping means, a piston reciprocable in the cylinder and supportingly connected with the nozzle and sealing ring to move them vertically in unison, spring means acting on said piston to effect a down-stroke thereof from a relatively raised position in the cylinder so as to lower the sealing ring onto the mouth of the bottle that is held by the gripping means and to insert the nozzle downwardly into the mouth end of said bottle, and means for supplying fluid test pressure through the inserted nozzle into the bottle and concurrently onto the piston to aid retention of sealing contact of the sealing ring with the mouth of the bottle.

6. In bottle testing apparatus, the combination specified by claim 5 wherein the means for supplying fluid test pressure includes a source of supply of said pressure and means to cut off supply of such pressure through the nozzle and onto the piston in the event of an extended downstroke of the piston permitted by absence of a bottle from the gripping means.

7. Bottle testing apparatus comprising a turret rotatable about a vertical axis, a circular series of angularly spaced normally closed pairs of openable and closable bottle gripper jaws mounted on and movable by rotation of the turret along a path extending around said vertical axis, means to supply a bottle to be tested to each pair of gripper jaws at a bottle infeed point on said path, bottle testing means to apply fluid at a predetermined test pressure to the interior of each bottle held by a pair of gripper jaws during travel of such jaws and the bottle held thereby along a portion of the path located beyond said bottle infeed point, said bottle testing means comprising a normally closed fluid pressure delivery valve traveling with the bottle holding pair of gripper jaws and continuously supplied with fluid at a pressure regulated to that desired, fluid pressure conducting means for operatively connecting the delivery valve with the bottle held by the gripper jaws during their travel along said portion of said path, and a stationary cam arranged to open said delivery valve and keep it open for a predetermined test period during such travel, and means to effect removal of thus tested bottles from the pairs of gripper jaws.

8. Bottle testing apparatus comprising a turret rotatable about a vertical axis, a circular series of angularly spaced normally closed pairs of openable and closable bottle gripper jaws mounted on and movable by rotation of the turret along a path extending around said vertical axis, means to supply a bottle to be tested to each pair of gripper jaws at a bottle infeed point on said path, bottle testing means to apply fluid at a predetermined test pressure to the interior of each bottle held by a pair of gripper jaws during travel of such jaws and the bottle held thereby along a portion of the path located beyond said bottle infeed point, said bottle testing means comprising a normally closed fluid pressure delivery valve traveling with the bottle holding pair of gripper jaws and continuously supplied with fluid at a pressure regulated to that desired, fluid pressure conducting means for operatively connecting the delivery valve with the bottle held by the gripper jaws during their travel along said portion of said path, and a stationary cam arranged to open said delivery valve and keep it open for a predetermined test period during such travel, means to exhaust fluid pressure from the tested bottle and its connections with the delivery valve at the conclusion of said test period, said means including a normally closed exhaust valve traveling with and continuously communicating with said connections, and a stationary cam for opening the exhaust valve and maintaining it open for a predetermined time period, and means to effect removal of tested bottles from the pairs of gripper jaws.

9. Bottle testing apparatus comprising a turret rotating about a vertical axis, an endless series of angularly spaced pairs of gripping jaws mounted on the turret for rotation therewith about said axis, each pair of jaws being adapted when closed on a bottle to be tested to hold it firmly therebetween and when opened to release such bottle, spring means actuating said pairs of jaws and tending to keep them closed, a fixed position cam located adjacent to a portion of the path of movement of said series of pairs of jaws for opening each pair at the same point along said path for removal therefrom of a tested bottle, to keep said pair of jaws opening during travel along a short further portion of said path to receive another bottle to be tested, and then to close to carry the received bottle along a further portion of the path, a fluid test pressure applying and exhaust mechanism for each pair of jaws movable therewith by rotation of the turret and each including a source of regulated test pressure, a nozzle insertable in an acceptably formed neck portion of a bottle held by the associated pair of jaws, a sealing ring for contact with the mouth of such bottle, means for moving said nozzle and sealing ring vertically in unison between raised inactive positions and lowered active positions in the bottle neck and on the mouth of the bottle, respectively, and valved fluid pressure conducting means for delivering fluid test pressure from said source to the nozzle when it is in its lowered active position and for exhausting pressure therefrom after a predetermined period of pressure application, a normally retracted and inactive cam adapted when projected to open each pair of jaws arriving at a point along the path of movement thereof in advance of the point at which said jaws would be opened by the fixed position cam, and normally inactive means rendered effective by a drop from test pressure in the valved fluid pressure conducting means for any of the pairs of bottle gripper jaws during application of test pressure to such means, as because of breakage under the test pressure of a bottle held by said jaws or failure of such bottle to retain or receive applied test pressure, to move said movable cam to projected position to open said jaws.

10. Bottle testing apparatus comprising a turret mounted to rotate about a vertical axis, a circular series of spaced normally closed pairs of bottle gripper jaws carried by the turret so as to be moved by rotation of the turret along a circular path extending around said vertical axis, means to transfer sucessive bottles to be tested of an incoming line to successive pairs of gripper jaws arriving at a bottle infeed transfer point on said circular path, means for applying fluid test pressure for a predetermined test period to the interior of each bottle carried by a pair of gripper jaws from said infeed point along a further portion of said circular path, means to transfer to an outgoing line bottles which have satisfied applicable pressure test requirements as such bottles are brought by their carrying pairs of gripper jaws to a good bottle take-out point on said circular path, a movable cam for opening each pair of jaws at a defective bottle removal point on said circular path in advance of said bottle take-out point when the cam is in a relatively projected position with respect to said path and ineffective to open said jaws when the cam is in a relatively retracted position, and pressure responsive means controlling the position of said movable cam to retain it in its retracted position while the pairs of jaws carrying bottles which have withstood the fluid test pressure for the full test period pass said defective bottle removal point and to move it to its projected position to open at said defective bottle removal point any pair of jaws carrying a fragment of a tested bottle which released test pressure during the test period by breaking under such pressure or by leakage therefrom because of a choked or malformed neck or an unfilled or otherwise defective neck finish.

11. Bottle testing apparatus comprising a pair of gripper jaws for gripping the neck of a bottle to be tested, means to move said pair of jaws and a bottle gripped thereby along a predetermined path, means to apply fluid at a regulated test pressure through the mouth of said bottle to the interior thereof for a predetermined period while the jaws and bottle are passing along part of said path, means for sealing the mouth of the bottle while said fluid under test pressure is being applied thereto, and a reject mechanism to effect opening of the jaws to release at a reject station on said path the bottle neck previously gripped by the jaws if said bottle has been determined by said pressure test to be defective, said reject mechanism comprising a cam movable between a normally retracted inactive position at which it is ineffective to open said jaws and a projected active position at which it will open said jaws, a normally inactive pneumatic mechanism adapted when activated to move said cam from its inactive position to its active position, a pneumatic pressure control valve operatively connected to said pneumatic mechanism for controlling activation thereof, said valve normally preventing such activation, a valve actuating rod supported for movement with said gripper jaws along said path and for limited vertical movements between a relatively raised position at which it will be disabled to actuate said valve and a downwardly projected lowered position at which it will be effective to actuate the valve to effect activation of said pneumatic mechanism and consequent projection of said cam to its active position, pressure responsive means having a fluid pressure conducting connection with the means to apply fluid test pressure to the bottle undergoing test and controlled by such pressure to prevent descent of the valve actuating rod to its valve actuating position while subjected to full test pressure and to permit such descent when such pressure is reduced, and other means co-acting with said pressure responsive means to determine the point along the path of movement of said jaws and rod at which the rod can descend to its active position if permitted to do so by the pressure responsive means.

12. Bottle testing apparatus comprising a pair of gripper jaws for gripping the neck of a bottle to be tested, means to move said pair of jaws and a bottle gripped thereby along a predetermined path, means to apply fluid at a regulated test pressure through the mouth of said bottle to the interior thereof for a predetermined period while the jaws and bottles are passing along part of said path, means for sealing the mouth of the bottle while said fluid under test pressure is being applied thereto, and a reject mechanism to effect opening of the jaws to release at a reject station on said path the bottle neck previously gripped by the jaws if said bottle has been determined by said pressure test to be defective, said reject mechanism comprising a cam movable between a normally retracted inactive position at which it is ineffective to open said jaws and a projected active position at which it will open said jaws, a normally inactive pneumatic mechanism adapted when activated to move said cam from its inactive position to its active position, a pneumatic pressure control valve operatively connected to said pneumatic mechanism for controlling activation thereof, said valve normally preventing such activation, a valve actuating rod supported for movement with said gripper jaws along said path and for limited vertical movements between a relatively raised position at which it will be disabled to actuate said valve and a downwardly projected lowered position at which it will be effective to actuate the valve to effect activation of said pneumatic mechanism and consequent projection of said cam to its active position, pressure responsive means having a fluid pressure conducting connection with the means to apply fluid test pressure to the bottle undergoing test and controlled by such pressure to prevent descent of the valve actuating rod to its valve actuating position while subjected to full test pressure and to permit such descent when such pressure is reduced, a pivoted latch movable with said grippers and said rod along their path of movement and normally underlying said rod to prevent descent thereof even though permitted by said pressure responsive means, and a trip pin located at a predetermined fixed position along said path to contact the latch and to swing it clear of the path of descent of the rod.

References Cited in the file of this patent

UNITED STATES PATENTS

| | | |
|---|---|---|
| 1,316,549 | Winkley | Sept. 16, 1919 |
| 2,314,310 | Jackson et al. | Mar. 16, 1943 |
| 2,432,871 | Fedorchak et al. | Dec. 16, 1947 |

FOREIGN PATENTS

| | | |
|---|---|---|
| 695,547 | France | Sept. 30, 1930 |